US012337372B2

(12) United States Patent
Lu et al.

(10) Patent No.: US 12,337,372 B2
(45) Date of Patent: Jun. 24, 2025

(54) LOW-FRICTION TAPERED ROLLER BEARING AND MANUFACTURE METHOD THEREOF

(71) Applicant: AKTIEBOLAGET SKF, Gothenburg (SE)

(72) Inventors: Jinyan Lu, Yinchuan (CN); Xiaoyu Zhang, Shanghai (CN); Ya Wang, Shanghai (CN); Congying Wang, Quzhou (CN)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 18/487,385

(22) Filed: Oct. 16, 2023

(65) Prior Publication Data

US 2024/0165691 A1 May 23, 2024

(30) Foreign Application Priority Data

Nov. 18, 2022 (CN) ......................... 202211445545.4

(51) Int. Cl.
*B21D 53/10* (2006.01)
*F16C 19/36* (2006.01)

(52) U.S. Cl.
CPC ............ *B21D 53/10* (2013.01); *F16C 19/364* (2013.01); *F16C 2223/10* (2013.01)

(58) Field of Classification Search
CPC ............... F16C 19/364; F16C 2240/54; Y10T 29/49636–4971
See application file for complete search history.

(56) References Cited

U.S. PATENT DOCUMENTS 1,247,858 A * 11/1917 Miller ................... F16C 19/364 384/560
1,294,183 A * 2/1919 Simmons ................ F16C 19/30 384/594
1,785,617 A * 12/1930 Cowburn ................ F16C 19/54 384/535
1,787,712 A * 1/1931 Wooler ............... F16C 33/4629 384/571
1,961,134 A * 6/1934 Buckwalter ........... F16C 33/605 384/571
3,737,204 A * 6/1973 Burkhardt ............... F16C 33/64 384/912
6,261,004 B1 * 7/2001 Tsujimoto ............... F16C 33/54 384/571
6,318,897 B1 * 11/2001 Shitsukawa ........... F16C 33/585 384/450
10,781,859 B2 9/2020 Bergmann et al.
11,137,030 B2 10/2021 Horchheimer et al.
11,319,993 B2 5/2022 Schleinitz
(Continued)

*Primary Examiner* — Jason L Vaughan
(74) *Attorney, Agent, or Firm* — J-TEK LAW PLLC; Scott T. Wakeman; Mark A. Ussai

(57) ABSTRACT

A method includes providing a tapered roller bearing including an outer ring having a raceway surface, an inner ring having a raceway surface and a plurality of tapered rollers each having a rolling surface and a large end-face; optimizing a surface roughness of at least one surface selected from the following set of surfaces: the outer ring raceway surface, the inner ring raceway surface, the rolling surfaces of the tapered rollers and the large end faces of the tapered rollers; and black oxidizing the at least one first surface.

17 Claims, 1 Drawing Sheet

10
30
4
21
31
32
22
20

(56) References Cited

U.S. PATENT DOCUMENTS

| | | | | |
|---|---|---|---|---|
| 2002/0044707 | A1* | 4/2002 | Hanai | F16C 33/366 384/571 |
| 2005/0047699 | A1* | 3/2005 | Tsujimoto | F16C 19/364 384/450 |
| 2007/0177838 | A1* | 8/2007 | Tsujimoto | F16C 19/364 384/571 |
| 2013/0251298 | A1* | 9/2013 | Gegner | F16C 33/64 384/570 |
| 2014/0356639 | A1* | 12/2014 | Gegner | B05D 3/102 427/430.1 |
| 2018/0128317 | A1* | 5/2018 | Horchheimer | F16C 33/62 |
| 2019/0186544 | A1* | 6/2019 | von Schleinitz | F16C 33/62 |
| 2020/0362912 | A1* | 11/2020 | Okada | F16C 19/364 |
| 2021/0071711 | A1* | 3/2021 | Okada | F16C 33/64 |
| 2021/0231169 | A1* | 7/2021 | Kawai | F16C 33/366 |
| 2022/0411936 | A1* | 12/2022 | von Schleinitz | C23C 22/80 |

* cited by examiner

LOW-FRICTION TAPERED ROLLER BEARING AND MANUFACTURE METHOD THEREOF

CROSS-REFERENCE

This application claims priority to Chinese patent application no. 202211445545.4 filed on Nov. 18, 2023, the contents of which are fully incorporated herein by reference.

TECHNOLOGICAL FIELD

The present disclosure provides a manufacture method of a low-friction tapered roller bearing and provides a low-friction tapered roller bearing.

BACKGROUND

Bearings are common rotating mechanisms that are commonly used in various fields. Performance of bearings often affects performance of the related structures and equipment. Particularly for the automobile field, the friction among moving parts in bearings may significantly affect the energy consumption and the motion performance of the whole automobile.

Therefore, it is desirable to reduce the friction among moving parts in bearings and thus reduce the friction torque of the bearings. Particularly for tapered roller bearings, it is very important to further reduce the friction torque of the tapered roller bearings because they are often used for wheel hubs, drive axles and other components in automobiles, and this is also an important demand for energy conservation and emission reduction.

However, common friction reduction solutions in the prior art realize very limited effect on reducing the friction torque of the tapered roller bearings, and it is difficult to meet the higher requirements of wheel hubs, drive axles and other components in automobiles. Therefore, there is a need in the present field to develop a solution that can be performed easily and cost-effectively, to significantly reduce the friction torque of the tapered rollers bearings.

SUMMARY

In view of the problems and demands mentioned above, the present disclosure is directed to a solution to the above problems.

The present disclosure provides a manufacture method of a low-friction tapered roller bearing, the tapered roller bearing comprising an outer ring, an inner ring and a plurality of tapered rollers, wherein the outer ring comprises an outer ring raceway surface, the inner ring comprises an inner ring raceway surface and each of the plurality of tapered rollers comprises a rolling surface and a large end-face. The method includes:

Step 1: performing surface roughness optimization on at least one of the outer ring raceway surface, the inner ring raceway surface, the rolling surface and the large end-face;

Step 2: performing black oxidation on the at least one of the outer ring raceway surface, the inner ring raceway surface, the rolling surface and the large end-face which has undergone the surface roughness optimization.

The present disclosure provides a low-friction tapered roller bearing manufactured by the method.

The present disclosure also provides a method that includes selecting a tapered roller bearing having a friction torque too high for a given application, the tapered roller bearing including an outer ring having a raceway surface, an inner ring having a raceway surface and a plurality of tapered rollers each having a rolling surface and a large end-face; optimizing a surface roughness of at least one surface of the tapered roller bearing selected from a group consisting of: the outer ring raceway surface, the inner ring raceway surface, the rolling surfaces of the tapered rollers and the large end faces of the tapered rollers; black oxidizing the at least one surface, and after the optimizing and the black oxidizing, using the tapered roller bearing in the given application.

According to the present disclosure, roughness optimization is performed on working surfaces in a bearing, and then black oxidation is performed, which can greatly promote the formation of lubricant film on the relevant surfaces and significantly improve the lubricant adhesion onto the surfaces, thus showing an excellent effect of friction reduction. Moreover, the bearing to which the method of the present disclosure is applied can be manufactured with further reduced number of tapered rollers and increased diameter of tapered rollers, and, under the condition that the load requirement of the bearing is guaranteed, friction can be further reduced.

DETAILED DESCRIPTION

Figure 1:
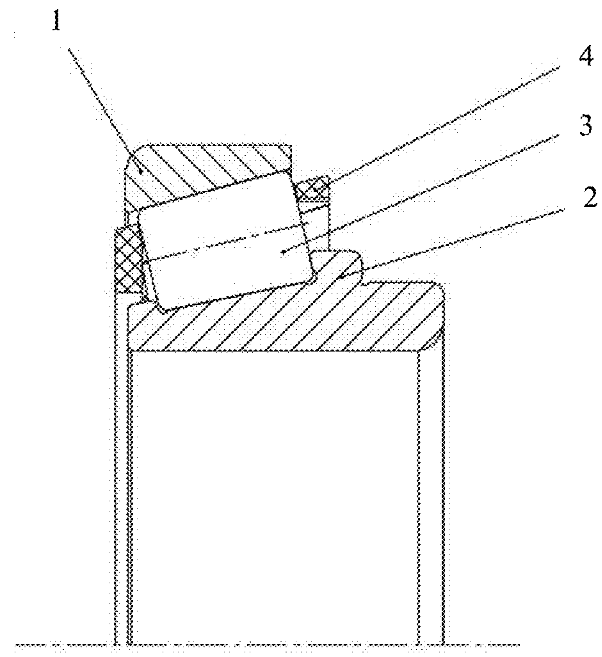
FIG. 1 is a schematic side elevational view, partly in section, of a first tapered roller bearing manufactured according to the method of the present disclosure.

In order to make the purpose, technical solution and advantages of the technical solution of the present disclosure clearer, the technical solution of the embodiment of the present disclosure will be described clearly and completely in the following with the attached drawings of specific embodiments of the present disclosure. Like reference numerals in the drawings represent like components. It should be noted that a described embodiment is a part of the embodiments of the present disclosure, not the whole embodiments. Based on the described embodiments of the present disclosure, all other embodiments obtained by those skilled in the present field without creative labor fall into the scope of protection of the present disclosure as defined by the claims attached hereto.

In comparison with the embodiments shown in the attached drawings, feasible embodiments within the protection scope of the present disclosure may have fewer components, other components not shown in the attached drawings, different components, components arranged differently or components connected differently, etc. Furthermore, two or more components in the drawings may be implemented in a single component, or a single component shown in the drawings may be implemented as a plurality of separate components.

Unless otherwise defined, technical terms or scientific terms used herein shall have their ordinary meanings as understood by those skilled in the present field to which this disclosure belongs. The terms “first”, “second” and similar terms used in the specification and claims of the patent application of this disclosure do not indicate any order, quantity or importance, but are only used to distinguish different components. When the number of components is not specified, the number of components can be one or more. Similarly, terms such as "a/an", "the" and "the" do not necessarily mean quantity limitation. Similar terms such as "including" or "comprising" mean that the elements or objects appearing before the terms cover the elements or objects listed after the terms and their equivalents, without excluding other elements or objects. Similar terms such as "installation", "setting", "connecting" or "connection" are not limited to physical or mechanical installation, setting and connection, but can include electrical installation, setting and connection, whether directly or indirectly. "Up", "down", "left" and "right" are only used to indicate the relative orientation relationship when the equipment is used or the orientation relationship shown in the attached drawings. When the absolute position of the described object changes, the relative orientation relationship may also change accordingly.

For the convenience of explanation, the direction of the rotation axis of the bearing is called an axial direction, and the direction perpendicular to the axial direction is called a radial direction. The term "inner/inward" refers to the direction toward the inside of the bearing, whereas the term "outer/outward" refers to the direction toward the outside of the bearing.

Figure 2:
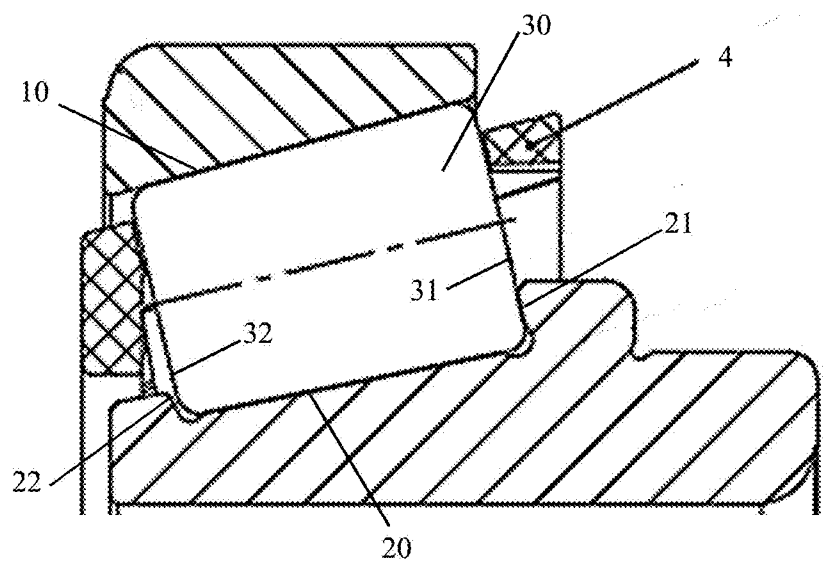
FIG. 2 is an enlarged view of a portion of FIG. 1.

As shown in FIGS. 1 and 2, according to a preferable embodiment of the present disclosure, a manufacture method of a low-friction tapered roller bearing is provided. The tapered roller bearing (hereinafter referred to as "the bearing") includes an outer ring 1, an inner ring 2, a plurality of tapered rollers 3, and a cage 4. The outer ring 1 includes an outer ring raceway surface 10, the inner ring 2 includes an inner ring raceway surface 20, and each of the plurality of tapered rollers 3 includes a rolling surface 30, a large end-face 31 (also known as spherical fiducial surface) and a small end-face 32. It should be understood that these surfaces 10, 20 and 30 are the main working surfaces in mutual contact in the bearing. In addition, the tapered roller bearing shown in the figures is mainly used to bear unidirectional axial forces, and thus the large end-face 31 will also form a large area contact with a first inner ring flange surface 21 of the inner ring 2, and large friction may be formed as well.

The method according to this preferred embodiment comprises:

Step 1: performing surface roughness optimization on at least one of the outer ring raceway surface 10, the inner ring raceway surface 20, the rolling surface 30 and the large end-face 31;

Step 2: performing black oxidation on the at least one of the outer ring raceway surface 10, the inner ring raceway surface 20, the rolling surface 30 and the large end-face 31, which has undergone the surface roughness optimization.

According to this method, in step 1, the surface roughness optimization may be selectively performed on the outer ring raceway surface 10 and/or the inner ring raceway surface 20 and/or the rolling surface 30 according to the actual design requirements, cost and processing conditions of the bearing; that is, the surface roughness optimization should be at least performed on one or more of the relevant surfaces of one of the above components. Of course, it is more preferable to optimize the surface roughness of the outer ring raceway surface 10 and the inner ring raceway surface 20 and the rolling surface 30 and the large end-face 31. And according to research of the inventors of the present disclosure, it is found that after the surface roughness optimization, these surfaces whose surface roughness has been optimized are particularly suitable for a subsequent black oxide treatment, and these surfaces demonstrate an excellent effect of friction reduction after the black oxidation.

In addition, in the prior art, black oxidation is usually used to improve the corrosion resistance of a component (when the component is exposed to harsh external environment), to prevent materials from cracking (when relevant portions of a component are under great stress), etc., but the black oxidation in the prior art does not demonstrate the effect of friction reduction between working surfaces in mutual contact in a bearing. Therefore, those skilled in the art will not perform black oxidation on a bearing for the purpose of reducing friction. However, according to research of the inventors of the present disclosure, black oxidation is performed on the relevant surfaces after the surfaces roughness thereof is optimized, which can greatly promote the formation of lubricant film on the surfaces and significantly improve lubricant adhesion onto the surfaces, thus achieving an excellent effect of friction reduction.

Further preferably, the surface roughness optimization in step 1 further comprises:

Step 1a, performing preliminary surface roughness optimization using a grinding wheel;

Step 1b: performing a final surface roughness optimization using an oilstone.

In the above steps, by the two-step surface roughness optimization, processing efficiency of the optimization can be greatly improved, and fine control of the final surface roughness can be enhanced to facilitate the subsequent black oxidation. Furthermore, it is preferable that, for the relevant surfaces after the final surface roughness optimization, that the roughness Ra thereof is lower than 0.08 μm and/or a peak height Rpk thereof is lower than 0.1 μm. It is found by research that the optimized surface roughness and the peak height will promote the black oxidation so that the relevant surfaces show excellent ability to promote the formation and adhesion of lubricant film and reduce sliding wear and adhesive wear, thus protecting the relevant surfaces in mutual contact even under a condition with low kappa (viscosity ratio).

It should be emphasized that although changing surface roughness will generally change friction of related surfaces in the present field, the friction reduction effect brought by simply decreasing the surface roughness is very limited, and the purpose of the present disclosure is to optimize the process of black oxidation by optimizing the surface roughness, thereby improving the formation and adhesion of lubricant film, and further achieving the effect of significant friction reduction.

In addition, for components with different structures, materials and functions, temperature range of conventional black oxidation is very large, and black oxidation may be performed through various different processes and steps. However, not all the black oxidation temperatures and processing steps can achieve an optimal friction reduction effect. Through extensive research by the inventors, it is found that the black oxidation in step 2 is preferably performed at a temperature of 135-150° C. and in a strong alkaline solution. Black oxidation in strong alkaline solution with the above temperature range is especially suitable for realizing further friction reduction for the surfaces undergoing the surface roughness optimization. For example, regarding martensitic hardening bearings, black oxidation in strong alkaline solution with the above temperature range is especially suitable for forming $Fe_4O_3$ on the surfaces undergoing the surface roughness optimization, so as to improve the microstructure of the relevant surfaces to reduce friction.

Further preferably, in addition to performing black oxidation on the above-mentioned surfaces 10, 20, 30 and 31, Step 1 may further comprise performing surface roughness optimization on the first inner ring flange surface 21; Step 2 also includes performing black oxidation on the first inner ring flange surface 21.

According to another preferable embodiment which is not shown, the tapered roller bearing may be designed to bear bidirectional axial forces. In this case, the outer ring 1 may include a first outer ring flange surface in contact with the large end-face 31 and a second outer ring flange surface in contact with the small end-face 32 (contact on different surfaces will occur according to different load directions). Accordingly, the second inner ring flange surface 22 of the inner ring 2 may contact the small end-face of the tapered roller 3 under different load conditions. In other words, there are possibilities that the flange surfaces of the inner and outer rings may contact the corresponding large/small end-faces.

Furthermore, for the bearing with this structure, the present disclosure also proposes that Step 1 may further comprise: performing surface roughness optimization on at least one of the small end-face 32, the first inner ring flange surface 21, the second inner ring flange surface 22, the first outer ring flange surface and the second outer ring flange surface; Step 2 may comprise: performing black oxidation on the at least one of the small end-face 32, the first inner ring flange surface 21, the second inner ring flange surface 22, the first outer ring flange surface and the second outer ring flange surface which has undergone the surface roughness optimization. More preferably, surface roughness optimization and black oxidation are performed on all the small end-face 32, the first inner ring flange surface 21, the second inner ring flange surface 22, the first outer ring flange surface and the second outer ring flange surface.

Further preferably, the method according to the present disclosure may further include a running-in process after the black oxidation, that is, the method of the present disclosure further comprises Step 3: performing a running-in process on the tapered roller bearing to further reduce the surface roughness of the relevant surfaces. After performing the running-in process, an excellent effect of friction reduction can be achieved due to the surface roughness optimization and the black oxidation according to the present disclosure.

Further preferably, in order to meet the structural and production requirements for certain bearings, Step 2 of the present disclosure may further comprise performing black oxidation on whole of each of the outer ring 1, the inner ring 2, and the plurality of tapered rollers 3, thereby simplifying the process of the black oxidation and improving the processing efficiency.

Furthermore, the present disclosure also provides a low-friction tapered roller bearing manufactured by the above method.

Moreover, the present disclosure also proposes that, under the condition that the friction of the bearing is optimized by the method of the present disclosure, number of the tapered rollers can be further reduced, and meanwhile, diameter of the tapered rollers can be increased in order to meet the load requirement.

In this respect, the inventors of the present disclosure conducted a comparative study on various series and models of tapered roller bearings. By comparing with tapered roller bearings not optimized by the method of the present disclosure, number of tapered rollers can be reduced by 3%~20%, and diameter of the large end-face of each tapered roller can be increased by 1%~10% (it should be understood that diameter of the small end-face may be further calculated according to a certain taper ratio), so that the friction torque of the whole bearing can be reduced by 10%~60%, and the service life can be increased by 24%. By comparison, it is found that the low-friction bearing manufactured by other methods of the prior art cannot achieve the above effect of friction torque reduction.

The exemplary implementation of the scheme provided in this disclosure has been described in detail above with reference to the preferable embodiments. However, it can be understood by those skilled in the art that without departing from the concept of this disclosure, various changes and modifications can be made to the above specific embodiments, and various technical features and structures provided in this disclosure can be combined in various ways without exceeding the scope of protection of this disclosure, which is determined by the appended claims.

What is claimed is:

1. A method comprising:

providing a tapered roller bearing including an outer ring having a raceway surface, an inner ring having a raceway surface and a plurality of tapered rollers each having a rolling surface and a large end-face, optimizing a surface roughness of at least one first surface selected from the group consisting of: the outer ring raceway surface, the inner ring raceway surface, the rolling surfaces of the tapered rollers and the large end faces of the tapered rollers, black oxidizing the at least one first surface.

2. The method according to claim 1, wherein the inner ring comprises a first inner ring flange surface in contact with the large end-face, the method further comprising optimizing a surface roughness of the first inner ring flange surface and black oxidizing the first inner ring flange surface.

3. The method according to claim 1, wherein each of the plurality of tapered rollers further comprises a small end-face, and wherein the inner ring comprises a first inner ring flange surface in contact with the large end-face and a second inner ring flange surface in contact with the small end-face, the method further comprising optimizing a surface roughness of at least one second surface selected from a group consisting of: the small end-face, the first inner ring flange surface, and the second inner ring flange surface, and black oxidizing the at least one second surface.

4. The method according to claim 1, wherein the optimizing the surface roughness comprises a preliminary surface roughness optimization using a grinding wheel and a final surface roughness optimization using an oilstone.

5. The method according to claim 4, wherein, optimizing the surface roughness comprises setting the surface roughness of the at least one first surface to be lower than 0.08 μm and/or setting a peak height Rpk of the at least one first surface to be lower than 0.1 μm.

6. The method according to claim 1 wherein the black oxidizing comprises black oxidizing at a temperature of 135-150° C. in a strong alkaline solution.

7. The method according to claim 1 further comprising:

performing a running-in process on the tapered roller bearing to further reduce the surface roughness of the at least one first surface.

8. The method according to claim 1, including black oxidizing an entirety of the outer ring and/or the inner ring and/or the plurality of tapered rollers.

9. A low-friction tapered roller bearing manufactured by the method according to claim 1.

10. The method according to claim 1, wherein optimizing a surface roughness comprise setting the surface roughness of the at least one first surface to be lower than 0.08 μm.

11. The method according to claim 1, wherein optimizing a surface roughness comprise setting a peak height Rpk of the at least one first surface to be lower than 0.1 μm.

12. The method according to claim 1, wherein the black oxidizing occurs after the optimizing.

13. The method according to claim 12, wherein optimizing a surface roughness comprise setting the surface roughness of the at least one first surface to be lower than 0.08 μm.

14. The method according to claim 12, wherein optimizing a surface roughness comprise setting a peak height Rpk of the at least one first surface to be lower than 0.1 μm.

15. A method comprising:

selecting a tapered roller bearing having a friction torque too high for a given application, the tapered roller bearing including an outer ring having a raceway surface, an inner ring having a raceway surface and a plurality of tapered rollers each having a rolling surface and a large end-face, optimizing a surface roughness of at least one surface of the tapered roller bearing selected from a group consisting of: the outer ring raceway surface, the inner ring raceway surface, the rolling surfaces of the tapered rollers and the large end faces of the tapered rollers, after the optimizing, black oxidizing the at least one surface, and after the optimizing and the black oxidizing, using the tapered roller bearing in the given application.

16. The method according to claim 15, wherein optimizing a surface roughness comprise setting the surface roughness of the at least one surface to be lower than 0.08 μm.

17. The method according to claim 15, wherein optimizing a surface roughness comprise setting a peak height Rpk of the at least one surface to be lower than 0.1 μm.

* * * * *